(12) United States Patent
Cainion

(10) Patent No.: US 6,286,967 B1
(45) Date of Patent: Sep. 11, 2001

(54) OUTSIDE MIRROR SYSTEM

(76) Inventor: Kenneth Cainion, 5140 Cascade Hills Cir., Atlanta, GA (US) 30331

( * ) Notice: Subject to any disclaimer, the term of this patent is extended or adjusted under 35 U.S.C. 154(b) by 0 days.

(21) Appl. No.: 09/556,583

(22) Filed: Apr. 24, 2000

(51) Int. Cl.[7] .................................................. G02B 7/182
(52) U.S. Cl. ......................... 359/871; 359/872; 359/873; 359/874
(58) Field of Search ..................................... 359/871, 872, 359/873, 874, 875, 876, 877, 604, 610, 612

(56) References Cited

U.S. PATENT DOCUMENTS

| 3,542,455 | 11/1970 | Jensen | 350/280 |
|---|---|---|---|
| 3,836,235 | 9/1974 | Russell | 350/280 |
| 3,924,938 | 12/1975 | Carson | 350/302 |
| 4,031,772 | 6/1977 | DeCastri | 74/501 M |
| 4,111,532 | * 9/1978 | Budish | 248/481 |
| 4,371,235 | 2/1983 | Locke, Sr. | 350/280 |
| 4,998,812 | * 3/1991 | Hon | 248/478 |
| 5,724,198 | * 3/1998 | Nishikawa et al. | 359/841 |
| 6,213,609 | * 4/2001 | Foote et al. | 359/841 |

* cited by examiner

Primary Examiner—Mohammad Sikder
(74) Attorney, Agent, or Firm—Henderson & Sturm LLP

(57) ABSTRACT

An outside mirror system for a vehicle such as a car or truck comprising a mirror housing unit having a pair of reflective element rotatably mounted from a central point and rotatable between a position exposing a nighttime mirror and a position exposing a daytime mirror. The mirrors are attached in an I-beam configuration with a connecting beam provided between the two mirrors at a right angle.

4 Claims, 2 Drawing Sheets

OUTSIDE MIRROR SYSTEM

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle accessories, and more particularly to a outside mirror system for day and night use.

2. Description of Related Art

As can be seen by reference to the following U.S. Pat. Nos. 3,542,455; 3,836,235; 3,924,938; 4,031,772; and 4,371,235 the prior art is replete with myriad and diverse vehicle mirror systems.

While all of the aforementioned prior art constructions are more than adequate for the basic purpose and function for which they have been specifically designed, they are uniformly deficient with respect to their failure to provide a simple, efficient, and practical outside mirror for day and night vision.

As a consequence of the foregoing situation, there has existed a longstanding need for a new and improved dual outside mirror system and the provision of such a construction is a stated objective of the present invention.

BRIEF SUMMARY OF THE INVENTION

Briefly stated, the present invention provides an outside mirror system for a vehicle such as a car or truck comprising a mirror housing unit having a pair of reflective element rotatably mounted from a central point and rotatable between a position exposing a nighttime mirror and a position exposing a daytime mirror. The mirrors are attached in an I-beam configuration with a connecting beam provided between the two mirrors at a right angle. The outer half of the perimeter of the mirror housing carries a row of LED's that operate in conjunction with the vehicle turn signals. If desired, a sensor can be provided on the mirror housing and an electric motor provided so that day and nighttime conditions can be detected and the suitable mirrors automatically exposed. In another preferred embodiment a thermometer is provided on the exterior of the housing of the driver's side and a small video camera is provided on the passenger side mirror which provides a signal to a dash mounted monitor.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
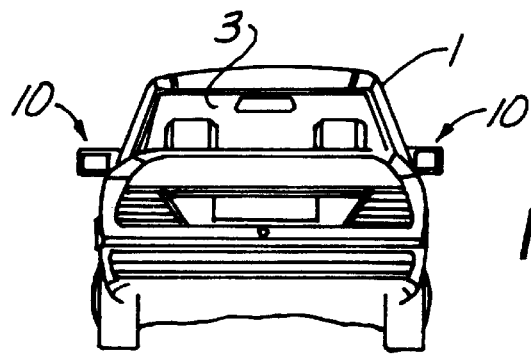
FIG. 1 is a rear elevational view of a vehicle using the outside mirror system of the present invention.
Figure 3:
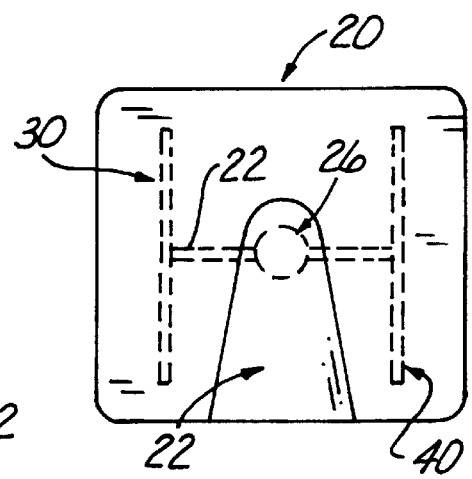
FIG. 3 is a side elevational view thereof.
Figure 2:
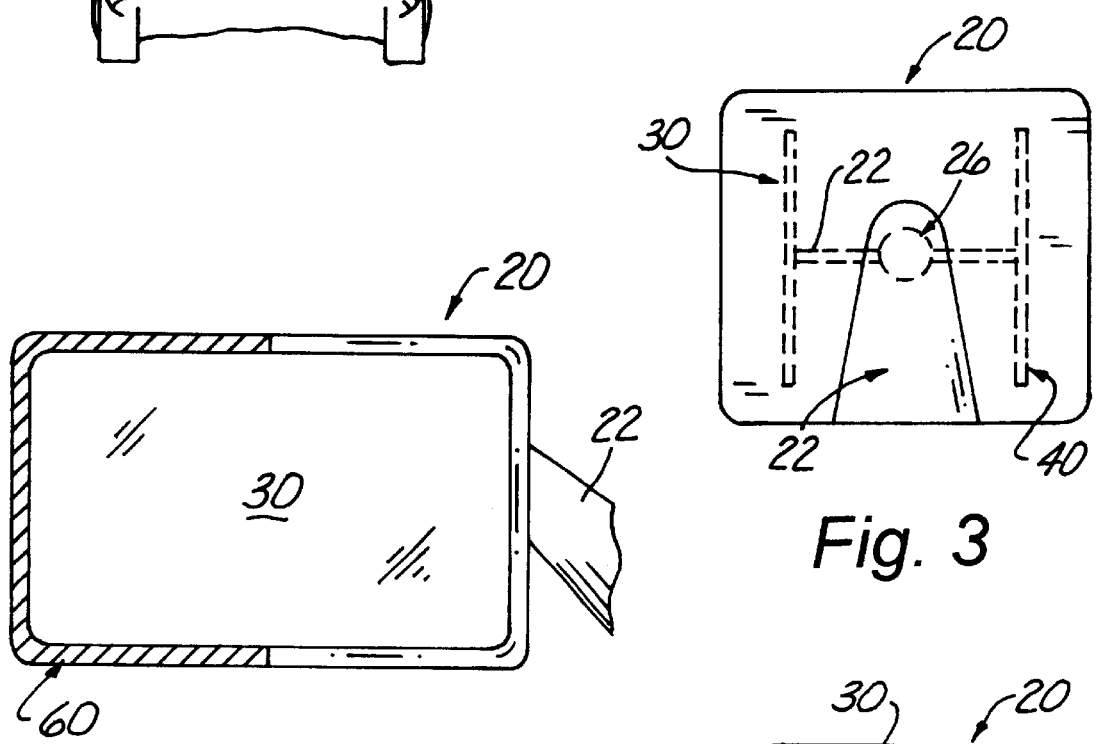
FIG. 2 is an enlarged front elevational view of the outside mirror system with the daytime mirror positioned in the housing to be viewed by the user.
Figure 5:
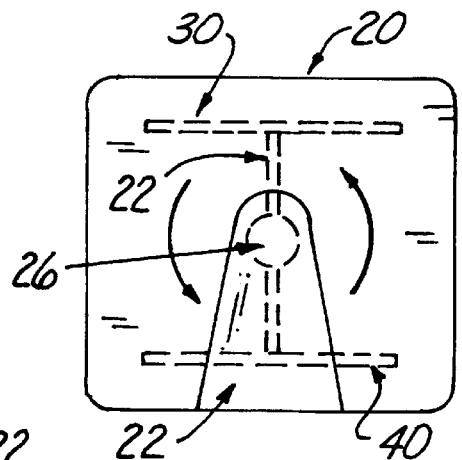
FIG. 5 is a side elevation view thereof.
Figure 4:
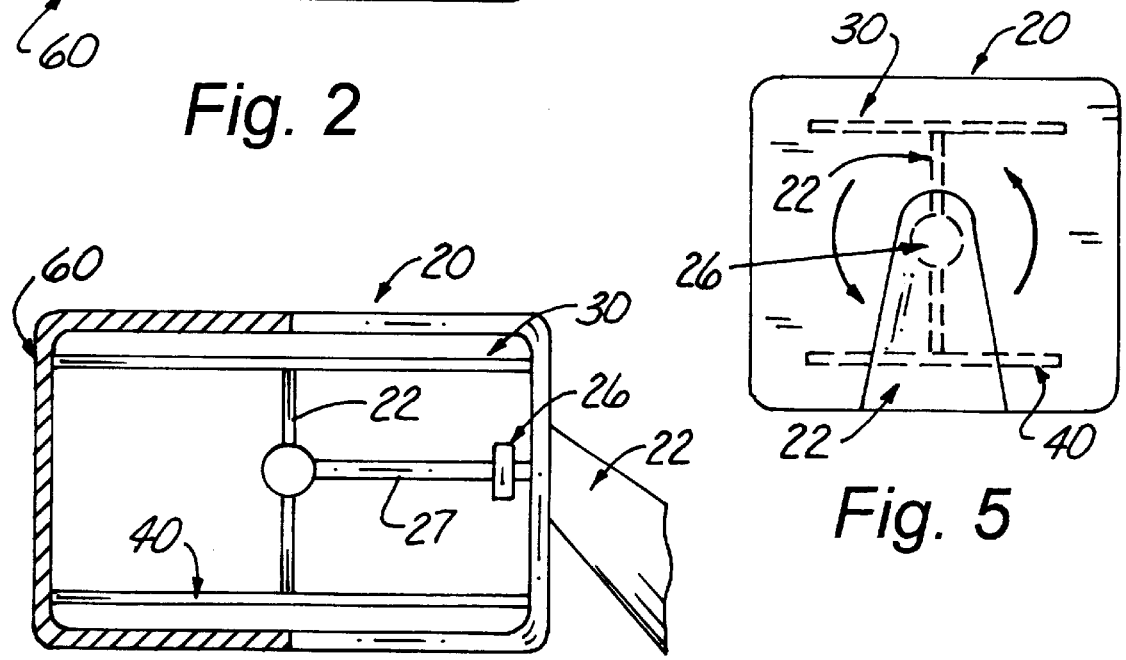
FIG. 4 is a front elevational view similar to FIG. 2 but showing the mirror system as it is being rotated from use with the daytime mirror to use with the nighttime mirror.

As can be seen by reference to the drawings, and in particularly to FIG. 1, the outside mirror system that forms the basis of the present invention is designated generally by the reference number 10.

The mirror system 10 includes a housing 20 attached by an arm 22 to the exterior of the vehicle 1 with a control 50 mounted at a convenient location within the passenger compartment 3, such as the dashboard. The housing 20 rotatably supports an I-beam bracket 22 that carries two mirrors 30, 40. The bracket 22 rotates to allow one mirror 30 to be used for daytime driving, while the other mirror 40 is used for nighttime driving.

The bracket 22 is attached to a motor 23 that allows the assembly to rotate or "flip over" so that one mirror 30 is available for daytime driving, and the other mirror 40 is available for nighttime driving. The nighttime mirror 40 features a dark tinted coating to greatly reduce the intensity of reflected headlights from behind, preventing the driver from being blinded. A dashboard mounted control panel 50 allows left and right mirror systems 10 to be individually adjusted and selected for either daytime or nighttime use. The outer half of the perimeter of the housing 22 features a row of LED's 60 that operate in conjunction with the vehicle turn signals, to provide enhanced safety when making turns. As an option, the outside mirror system 10 could feature a sensor that would detect day or night conditions and automatically flip the system 10 to the applicable position. In addition, the driver's side mirror system 10 could incorporate a small corner mounted thermometer, and the passenger side mirror system 10 could feature a miniature video camera to provide a view of the vehicle's blind spot on a small dash-mounted monitor.

Figure 6:
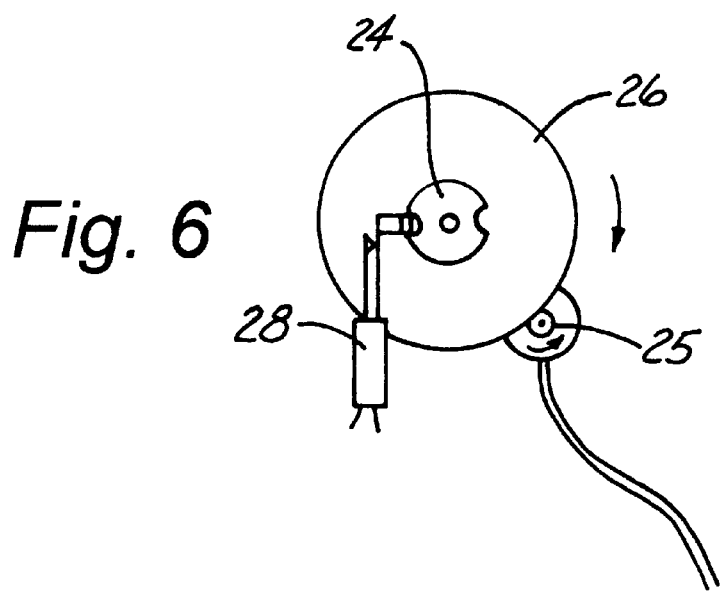
FIG. 6 is a greatly enlarged side elevational view illustrating the motor driven electrical cam control.

FIG. 6 illustrates a DC motor 23 driving an electrical control cam 24 that drives or rotates the system 10 from day to night mode. The drive motor 23 has a drive gear 25 on its shaft 27 that makes connection with a much larger driven gear 26 that attaches to the end of the shaft 27. The motor 23 turns the shaft 27 and is controlled by the cam-controlled micro-switch 28, which turns power to the drive motor 23 off whenever one of the two low spots on the cam 24 causes the micro-switch 28 to disconnect power from the drive motor. The indexing cam 24 is designed to always keep one of the two mirrors 30, 40 facing in the proper direction as described previously.

Figure 7:
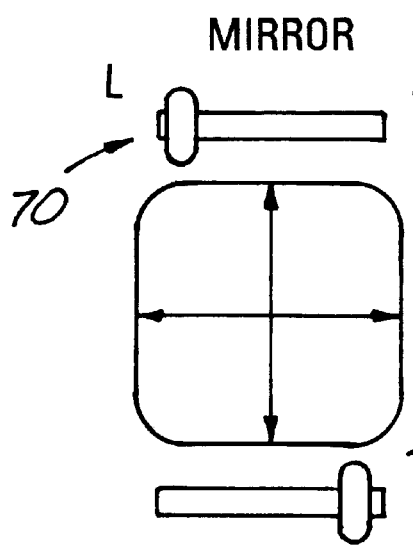
FIG. 7 is a front elevational view of the mirror control that is positioned within the passenger compartment of the vehicle.
Figure 8:
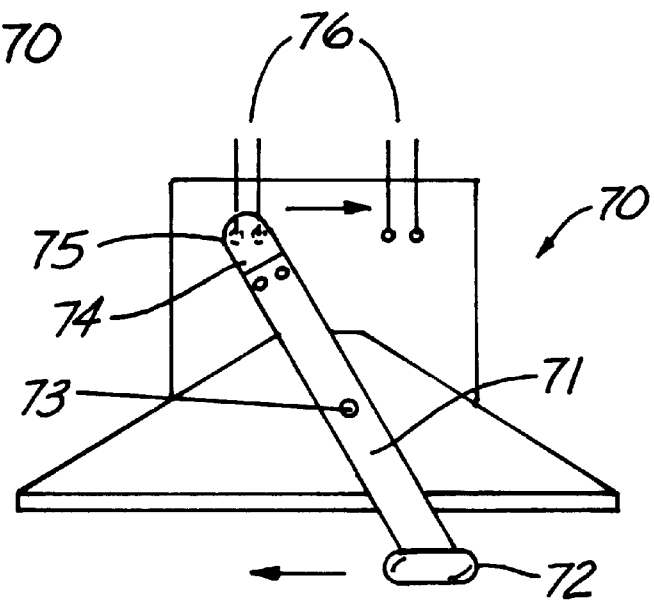
FIG. 8 is a top plan view of the slide switch assembly of the mirror central.

FIG. 7 shows the control 50 and FIG. 8 shows the switch 70 that lends itself to activate the left and right mirror systems 10 day over night positions. The lever portion 71 of the switch has a plastic knob 72, a pivot point 73 and an insulator 74 that attaches the metal contact portion 75 of the switch to the lever 71. The metal contact portion 75 of the lever 71 aligns itself over two switch contacts 76 in order to function as a switch. There are two sets of "fixed" contacts 76 that make face-to-face contact with the moving metal contact 75 attached to the end of the lever 71, providing the necessary described functions of the mirror system 10.

In use, the user, when driving in the dark, would simply flip the dash mounted switch 70 to "night" and enjoy the benefit of being able to drive without the annoying and dangerous glare from the headlights of cars behind blinding them as they drive. The tinted coating eliminates most of the glare, while still allowing the driver to clearly see the vehicles in the mirror. During daytime hours, the switch 70 is positioned in the "day" position, allowing maximum daytime rearview vision for the driver. The incorporated turn signals 60 blink with the vehicle's normal turn signals when making a turn, providing greater visibility of the driver's intention to the other vehicles on the road. Use of the mirror system 10 provides a very practical and easy to use method of solving he problem of being blinded by the lights of trailing vehicles while driving at night.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An outside mirror system for a vehicle, comprising:
   a housing attached to an exterior surface of the vehicle, the housing including an open side and a peripheral rim disposed around the open side;
   a bracket rotatably mounted within the housing, the bracket carrying a daytime mirror selectively registerable with the open side of the housing, and a nighttime mirror disposed parallel to and directed away from the daytime mirror and being selectively registerable with the open side;
   an electric motor drive operably attached to the bracket; and
   a control mounted to an interior surface of the vehicle and being electrically coupled to the drive motor, wherein the control is operated to selectively position one of the daytime mirror and the nighttime mirror in registry with the open side of the housing.

2. The mirror system of claim 1 further including:
   an LED strip disposed along an outer portion of the peripheral rim of the mirror housing, the strip being electronically coupled to and synchronized with a turn signal of the vehicle.

3. The mirror system of claim 1 further including a cam attached to the rotating bracket, and a micro-switch operably associated with the cam wherein the drive motor is deactivated at one of two selected positions corresponding to registration of the daytime mirror and nighttime mirror with the open side of the housing.

4. The mirror system of claim 2 further including a cam attached to the rotating bracket, and a micro-switch operably associated with the cam wherein the drive motor is deactivated at one of two selected positions corresponding to registration of the daytime mirror and nighttime mirror with the open side of the housing.

* * * * *